Figure 1:
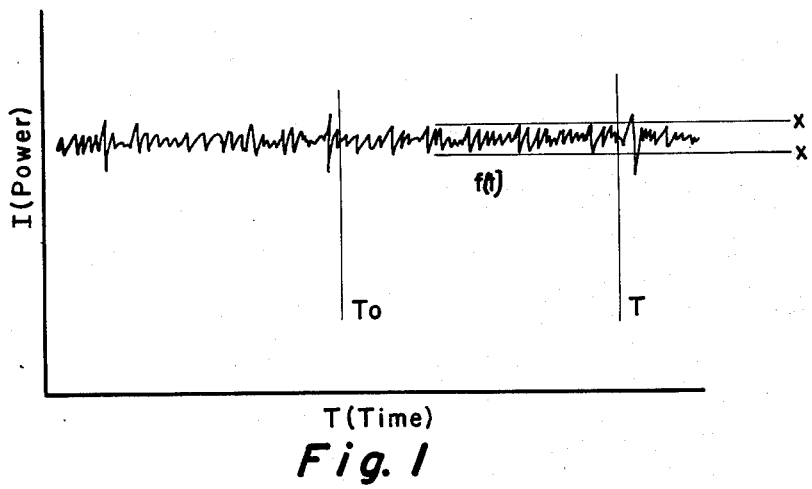

March 15, 1966   M. A. SCHULTZ   3,240,919
METHOD AND APPARATUS FOR DETERMINING THE
TRANSFER FUNCTION OF A PROCESS
Filed Aug. 18, 1961   2 Sheets-Sheet 1

INVENTOR.
Mortimer A. Schultz

BY
HIS ATTORNEYS

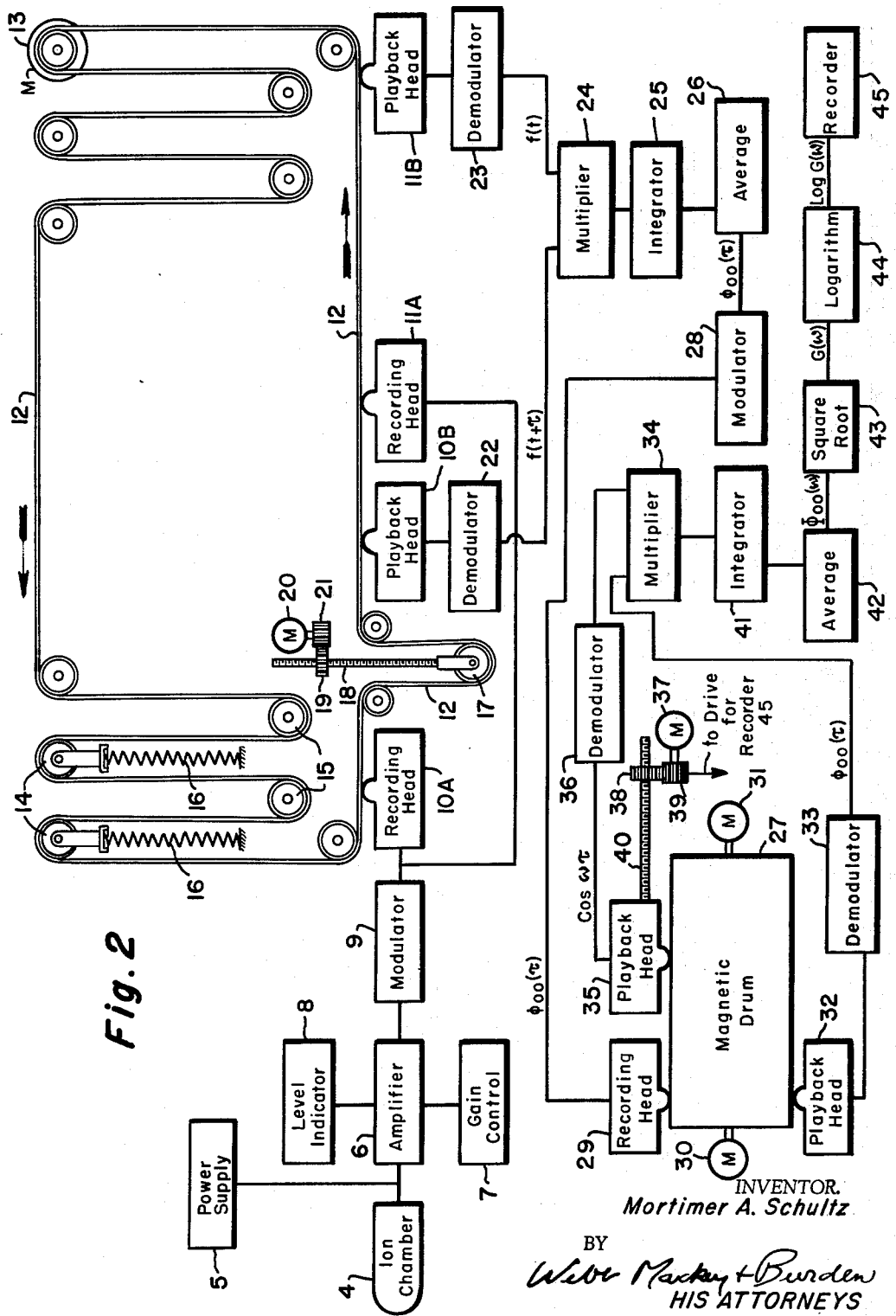

United States Patent Office 3,240,919
Patented Mar. 15, 1966

3,240,919
METHOD AND APPARATUS FOR DETERMINING THE TRANSFER FUNCTION OF A PROCESS
Mortimer A. Schultz, Pittsburgh, Pa., assignor, by mesne assignments, to RIDC Industrial Development Fund, a Pennsylvania development credit corporation
Filed Aug. 18, 1961, Ser. No. 132,341
3 Claims. (Cl. 235—151.1)

The transfer function of a process is defined as the ratio of the output to the input in relation to frequency over any range of frequencies of interest. It can be represented by a curve in which the logarithm of the ratio of the output to the input is plotted against frequency. An example of such a curve is a frequency response curve showing the relative output in decibels of a loud-speaker over a range of frequencies. While the transfer function of some processes or operations can readily be determined by varying their input frequency of operation, i.e., amplifiers, loud-speakers, etc., in many processes, it is highly undesirable to vary the input frequency signal because the process or the product may be adversely affected by such variation or the input to the processes may simply be unavailable to the operator of the process plant.

It has been shown theoretically that the transfer function of some processes can be determined over a range of frequencies of interest from the inherent noise generated by the process. Noise in a process consists of a random variation (as the process continues) in a physical characteristics of the product of the process or a variation in a condition under which the process is being conducted. For example, in a process of making paper, noise may be random variations in the thickness or random variations in the weight per unit area of the paper produced. In the case of an oil refinery, noise may be random variations in the temperature of a particular location in the cracking column and, in the case of a steam boiler, noise may consists in random variations in steam pressure. In the case of an atomic reactor, noise may consist in random variations in the power level of the reactor, i.e., the rate at which fission is occurring in the reactor.

In one of these random processes, it can be shown that the magnitude of the transfer function squared is equal to the Fourier cosine transform of an output auto-correlation function divided by an input auto-correlation function, i.e., $$|G(\omega)|^2 = \frac{\Phi_{oo}(\omega)}{\Phi_{ii}(\omega)}$$

where $|G(\omega)|$ is the magnitude of the transfer function and $\Phi_{oo}(\omega)$ is the Fourier cosine transform of the output auto-correlation function and $\Phi_{ii}(\omega)$ is the Fourier cosine transform of the input auto-correlation function.

For a truly random process, $\Phi_{ii}(\omega)$ may be considered to equal unity and hence, for this type of process the input signal may be ignored in deriving the transfer function.

My inventions consist in method and apparatus for solving these equations. The noise of the process whose transfer function is to be determined is observed by a suitable transducer such as an ion chamber, pressure sensor, temperature sensor, thickness gauge, gas analyzer, etc. The transducer produces an output which is recorded and processed to develop the transfer function of the process being studied.

Figure 3:
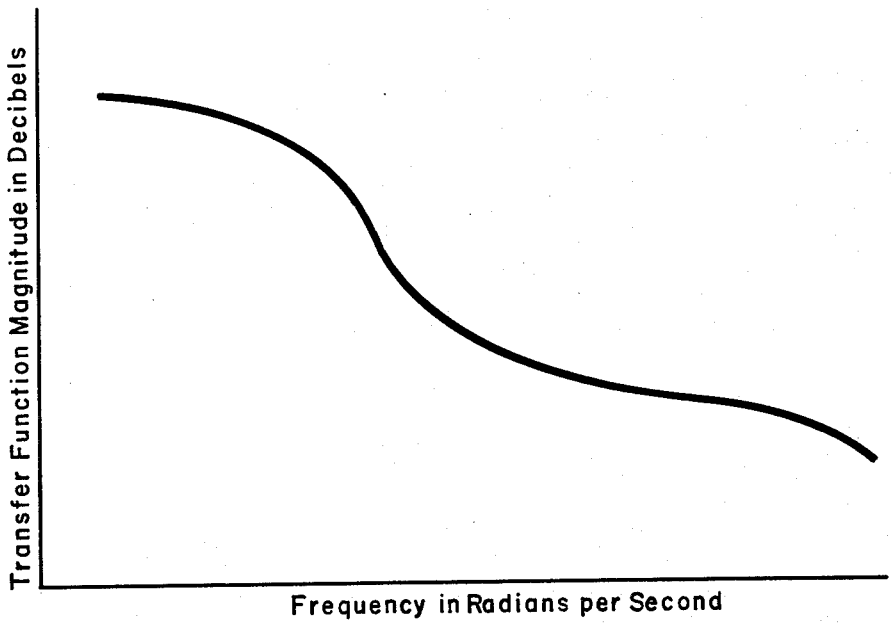

My inventions are particularly useful in determining the transfer function of an atomic reactor and, therefore, they will be described with reference thereto, although it is to be understood that they may be applied to any process whose transfer function is desired In determining the transfer function of an atomic reactor, I place in or adjacent to the reactor an ion chamber which acts as a transducer and produces a signal proportional to radiation within the reactor, this radiation being a function of the power of the reactor or of the rate at which fission is occurring within the reactor. The signal from the ion chamber may be amplified and is then further processed to obtain the transfer function of the reactor, as will be described with reference to the accompanying drawings, in which:

FIGURE 1 is a graph in which the signal provided by an ion chamber of a reactor is plotted against time;
FIGURE 2 is a diagrammatic showing of aparatus for computing the transfer function; and
FIGURE 3 is a graph illustrating a transfer function which has been computed.

FIGURE 1 illustrates a graph in which the current from an ion chamber within the reactor is plotted against time, the current being proportional to the power of the reactor. A period of operation for observation is selected and is indicated on the graph as the time period $T_o - T$, $T_o$ being the start of the period of observation and $T$ the end of the period. The noise of the reaction process is shown by the random variations in the curve between the lines X—X. The output, as indicated, for the time period $T_o - T$ is a function in time which may be written as $f(t)$.

FIGURE 2 illustrates diagrammatically the apparatus which I have developed for processing the output of a transducer to obtain the transfer function of a process being observed. In the specific instance illustrated, the process is that carried on in an atomic reactor. Referring to FIGURE 2, an ion chamber 4 is positioned within the reactor structure and is supplied with high voltage from a power supply 5. The output from the ion chamber is amplified in an amplifier 6. This amplifier has a gain control 7 and a level indicator 8 which may be a meter to show that the output, as amplifier, is at a level suitable for recording.

The frequencies of interest in the process being observed may be too low to record satisfactorily and, in that case, it may be necessary to modulate the output of the transducer as amplified. For that purpose, a modulator 9 is provided. This modulator may be an amplitude modulator, a frequency modulator, a phase modulator, or any suitable combination of these.

The output of the modulator is fed to two recording heads 10A and 11A each of which has a corresponding playback head 10B and 11B, respectively. A continuous magnetic tape 12 moves past the recording and playback heads. It is driven by a motor 13 and it is stored in a looper having two sets of pulleys 14 and 15 which are resiliently pressed away from each other by compression springs 16 to maintain suitable tension in the tape.

The recording head 10A and its corresponding playback head 10B record and transmit the information output of the transducer on one information channel and the recording head 11A and its corresponding playback head 11B record and transmit the information output of the transducer on a second channel. The distance between the recording head 11A and its corresponding playback head 11B is fixed, but the distance that the tape travels between the recording head 10A and its corresponding playback head 10B can be varied by means of a movable idler pulley 17. The pulley is mounted on a lead screw 18 threaded into a nut 19 which may be turned by a motor 20 through a pinion 21 which meshes with the nut. Rotation of the motor 20 will thereby move the idler pulley 17 so as to vary the distance between the recording head 10A and the playback head 10B.

The two information channels which are recorded differ from each other only in that one channel is displaced from the other in time by a variable delay called $\tau$. The two channels are functions in time and may be written as $f(t')$ and $f(t'+\tau)$, respectively. If the idler pulley is raised so that $\tau$ is zero, there is a fixed delay $\tau_0$ between the $f(t')$ which is generated by the ion chamber and the $f(t')$ which is reproduced by the playback heads 10B and 1B. If the pulley 17 is moved downwardly to introduce a variable delay between the recording head 10A and playback head 10B, the output of the playback head 10B will be $f(t'+\tau_0+\tau)$, and the output of the playback head 11B will be $f(t'+\tau_0)$. Substituting $t=t'+\tau_0$, the outputs of the two heads become $f(t)$ and $f(t+\tau)$.

It should here be noted that, before the functions $f(t)$ and $f(t+\tau)$ can be used with satisfactory accuracy, the length of the function record, i.e., the time period $T_0-T$ (see FIGURE 1), should be approximately ten times the value of $\tau$. The range of the variation in $\tau$ is determined by the frequency of the process being observed. For a given frequency, $\tau$ is equal to one period, that is, the time for one cycle of that frequency to be completed.

If it has been necessary to modulate the output of the transducer prior to recording, it will be necessary to demodulate the output of the playback heads 10B and 11B after introducing the variable $\tau$. For that purpose, demodulators 22 and 23 are provided.

The delay between the two functions can be produced by other means, for example, a time-delay circuit employing a delay line could be employed or the two channels may be recorded on separate records and played back at different times. Another way would be to vary the distance along the tape between a recorder and its corresponding playback head. However, this latter arrangement has the disadvantage that short time delays cannot be accomplished beause of the physical size of the recording and playback heads.

The output of the transducers, as recorded on the tape 12, constitutes a record of random signals against time. It has been established mathematically that the output auto-correlation function (the average of the time integral of the product of a function times the function delayed by a time interval) can be applied to random signals. The next step in obtaining a transfer function according to my inventions is to obtain the output auto-correlation function of the two functions $f(t)$ and $f(t+\tau)$ which are the outputs of the playback heads 10B and 11B.

The output auto-correlation function $\Phi_{00}(\tau)$ is obtained by multiplying the two functions $f(t)$ and $f(t+\tau)$ together and integrating the resulting product with respect to time. This is accomplished on an analogue computer consisting of a multiplier 24, integrator 25, and an averaging mechanism 26.

It has previously been established that the square of the magnitude of the transfer function $G(\omega)$ is proportional to the Fourier cosine transform of the output auto-correlation function $\Phi_{00}(\tau)$. This quantity has been designated as $\Phi_{00}(\omega)$. The equation is $$|G(\omega)|^2 = \Phi_{00}(\omega) = \frac{1}{2\pi}\int_{-\infty}^{\infty} \phi_{00}(\tau)\cos\omega\tau d\tau$$

where $\omega$ is the frequency range of interest in radians per second. The steps of multiplying $\Phi_{00}(\tau)$ by $\cos\omega\tau$ and integrating in respect to $\tau$ are done by apparatus now to be described.

A spiral record is made on a magnetic drum 27 of the value $\cos\omega\tau$ by a properly phased oscillator which is stepped through discrete values of $\omega\tau$ from zero to the maximum values of $\omega$ and $\tau$. Each revolution of the drum represents a discrete frequency and the recording always commences with the value of $\cos\omega\tau$ for zero radians. This is done by pre-recording properly phased signals on the drum. The value of the output auto-correlation function $\Phi_{00}(\tau)$ is fed from the averaging mechanism 26 through a modulator 28, if needed, to a recording head 29 which records the value of $\Phi_{00}(\tau)$ on the magnetic drum. During the recording of the values just mentioned, the magnetic drum is driven by a recording motor 30. One revolution of the drum gives one play of the output auto-correlation function and one revolution of the drum gives the values of $\cos\omega\tau$ for a single frequency in radians per second.

Since time has no meaning in the auto-correlation function $\Phi_{00}(\tau)$, it is possible to speed up the playback of $\Phi_{00}(\tau)$ by a large factor if $\omega$ is multiplied by the same factor. Accordingly, on playback, the magnetic drum is driven by a playback motor 31 which drives the drum at a much higher speed than the motor 30. Playback of the drum generates the signals corresponding to the functions to be multiplied as a step in obtaining the Fourier transform according to the above equation.

A playback head 32 receives the output of the auto-correlation function which is played repetitively and which output may be demodulated, if necessary, by a demodulator 33 and fed to a multiplier 34. A playback head 35 moves across the magnetic drum and receives the output of the $\cos\omega\tau$ generator which is fed, if necessary, through a demodulator 36 to the multiplier 34. A motor 37, connected to a threaded nut 38 through a pinion 39, actuates a lead screw 40 which moves the playback head 35 across the drum.

The product of the multiplier 34 is fed to an intergrator 41 and the integration is fed to an averaging mechanism 42. The output of the averaging mechanism is $\Phi_{00}(\omega)$, which is the square of the magnitude of the transform function $G(\omega)$. Accordingly, the output from the averaging mechanism 42 is fed to mechanism 43 for obtaining the square root and the square root is fed into logarithm conversion apparatus 44 for producing the log $G(\omega)$ because it is customary to show the transfer function in terms of the log of the function against time. The log $G(\omega)$ is then sent to a recorder 45 driven by the motor 37 which also moves the playback head 35. FIGURE 3 illustrates a typical record from the recorder 45 in which the Y-axis of the record comes from the multiplication, integration, square root extraction, and logarithm conversion of the two signals on the drum and in which the X-axis of the record comes from the position of the playback head 35 which picks up the track giving the values of $\cos\omega\tau$. The plot if $G(\omega)$ in decibels against $\omega$ in radians per second, which is the transfer function magnitude.

An alternative method for performing the Fourier cosine transform is to generate values of $\cos\omega\tau$ by an oscillator which is stepped through a range of discrete values of $\omega\tau$ from zero to the maximum values of $\omega$ and $\tau$ and feed the output directly to the multiplier 34. The output of the logarithm converter 44 is fed to the Y-axis of the recorder 45 while the progressive values of $\omega$ produce the X coordinate.

In carrying out either of the two methods described above for generating the Fourier cosine transform and also for recording the functions $f(t)$ and $f(t+\tau)$ a suitable electrical circuit is utilized to synchronize the motors in the apparatus, specifically, the motor 13 which moves the magnetic tape 12, the motor 20 which varies the time delay between the two information channels, the recording motor 30 which drives the drum 27 when values are being recorded on the drum, and the motor 37 which moves the playback head 35 across the drum 27 during playback of records made on the drum and the recorder 45.

As has just been explained, my method and apparatus make it possible to obtain the transfer function of a process solely from inherent noise generated by the process without the necessity of varying in any way the operation being observed. It is obvious that this is an important and valuable result.

Also, transfer functions can be obtained in far less time than has heretofore been possible. Specifically, prior to my inventions, it was possible to obtain the transfer function of an atomic reactor only after repeated measurements and calculations and only after hand and digital computer calculations requiring, at times, a month to complete. With my method and apparatus, it is possible to obtain a transfer function for a reactor in approximately fifteen minutes.

The ready availability of transfer functions of atomic reactors can be of special value in the operation of the reactor. The function can give the temperature coefficient, $\beta/1^*$ (the ratio of the fraction of delayed neutrons to the average life of the neutrons), the onset of boiling, and other safety information.

While I have described certain presently preferred embodiments of my invention, it is to be understood that they may be otherwise variously embodied within the scope of the appended claims.

In the specification and claims, I have used the word "process." It will be understood, however, that this term may refer to a machine, a system, a device, or a process at to which it is desirable to obtain the transfer function.

I claim:

1. Apparatus for determining the transfer function of a process which comprises (1) a transducer for observing noise generated by the process and for producing an output proportional to said noise, (2) means for recording from said transducer output two channels of information, (3) means for variably displacing said two channels from eath other in time, (4) a first computer for receiving the outputs of said two channels and producing a signal corresponding to the output auto-correlation function of the process, (5) means for generating a signal corresponding to the values of the cosine of specific frequencies of operation of the process over the frequency range of interest multiplied by variations in the time displacement of said channels over the range of said displacement, (6) means for synchronizing the output of said first computer with said signal of cosine values, and (7) a second computer for receiving the output of said first computer and said signals of cosine values to produce the transfer function.

2. Apparatus for determining the transfer function of a process as described in claim 1 in which the means for variably displacing the channels of information from each other in time comprises a magnetic tape, a recording head for recording one channel on said tape, a second recording head for recording a second channel on said tape, two playback heads, each operating in one of said channels, means for moving the tape past all of the heads and means for varying the length of the path of travel of the tape between one recording head and the playback head operating in the same channel as said recording head.

3. Apparatus for determining the transfer function of a process as described in claim 1 in which the means for variably displacing the channels of information from each other in time comprises a medium for receiving and storing signals, a recording head for impressing signals on one channel on said medium, a second recording head for impressing signals on a second channel on said medium, two playback heads, each operating in one of said channels, means for moving the medium past all of the heads and means for varying the length of the path of travel of the medium between one recording head and the playback head operating in the same channel as said recording head.

References Cited by the Examiner

UNITED STATES PATENTS

| | | | |
|---|---|---|---|
| 2,800,654 | 7/1957 | DeRosa | 235—181 |
| 2,940,076 | 6/1960 | Bissett et al. | 235—181 |
| 3,003,696 | 10/1961 | Tullos et al. | 235—181 |
| 3,011,713 | 12/1961 | Conner | 235—181 |
| 3,013,721 | 12/1961 | Foster et al. | 235—151 |
| 3,024,994 | 3/1962 | Buland et al. | 235—181 |

OTHER REFERENCES

Pages 427 to 438, 1955—Truxal: Automatic Feedback Control System Synthesis, McGraw-Hill.

MALCOLM A. MORRISON, *Primary Examiner.*

WALTER W. BURNS, JR., *Examiner.*